May 18, 1926.
F. SCHLATTAU
1,585,563
COMBINATION MEASURING INSTRUMENT
Filed Dec. 31, 1924  2 Sheets-Sheet 1
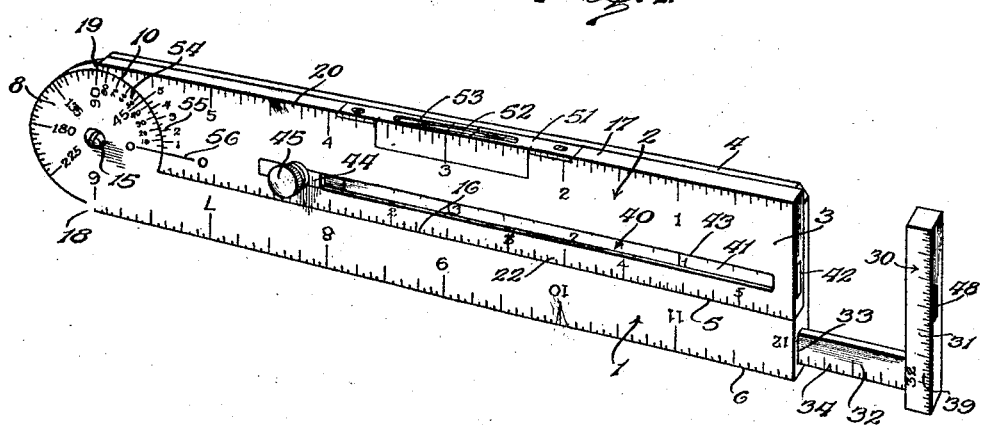
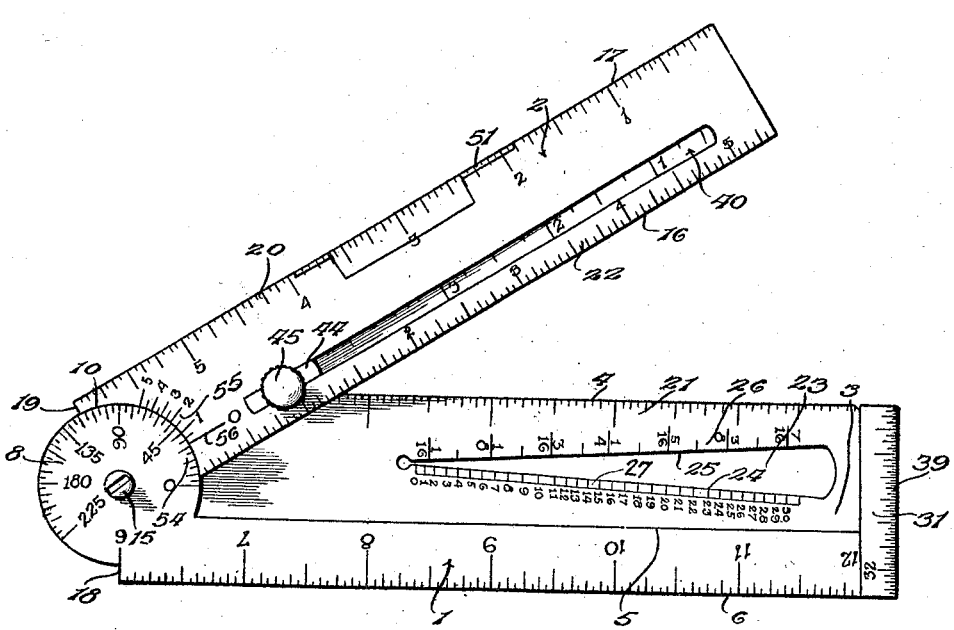
Inventor
F. Schlattau
By Lacy & Lacy, Attorneys May 18, 1926.
F. SCHLATTAU
1,585,563
COMBINATION MEASURING INSTRUMENT
Filed Dec. 31, 1924      2 Sheets-Sheet 2
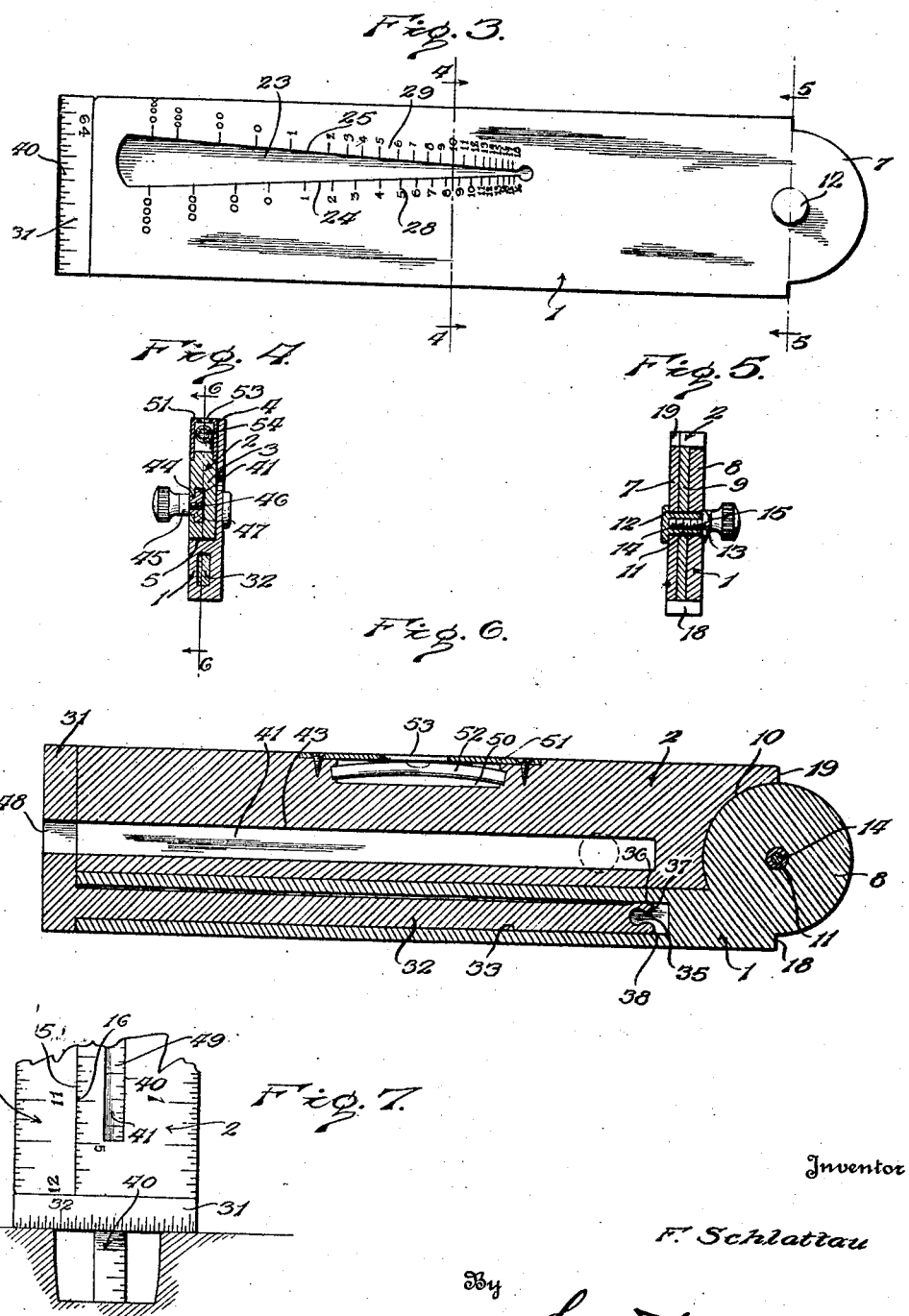
Inventor
F. Schlattau
By Lacey & Lacey, Attorneys Patented May 18, 1926.

1,585,563

UNITED STATES PATENT OFFICE.

FRANK SCHLATTAU, OF LOS ANGELES, CALIFORNIA.

COMBINATION MEASURING INSTRUMENT.

Application filed December 31, 1924. Serial No. 759,112.

This invention relates to improvements in combination measuring instruments and has as its general object to provide an instrument compactly arranged and adapted to be employed as a level, an angle, a square, a rule, a wire and screw gauge, a caliper gauge, a depth gauge, and a vernier protractor.

Another object of the invention is to provide an instrument of the class described embodying a depth gauging blade so mounted that it may be projected to a maximum distance to provide for a wide range of measurements and, when not in use, may be adjusted to occupy a position where it will not in any way interfere with the employment of the instrument to obtain other measurements.

Another object of the invention is to provide a novel form of caliper gauge which may be adjusted in a manner similar to the depth gauge, and to provide novel means for holding the caliper gauge in its various positions of adjustment.

Another object of the invention is to provide novel means embodying a novel arrangement of scales adapting the instrument to be employed as a vernier protractor.

In the accompanying drawings:

Figure 1 is a perspective view of the instrument embodying the invention adjusted for use as a caliper gauge.

Figure 2 is a view in elevation of the instrument adjusted for use as an angle or as a vernier protractor, or as a screw gauge, either as desired.

Figure 3 is a side elevation of the instrument looking at that side opposite the side displayed in Figure 2.

Figure 4 is a vertical transverse sectional view on the line 4—4 of Figure 3, looking in the direction indicated by the arrows.

Figure 5 is a similar view on the line 5—5 of Figure 3, looking in the direction indicated by the arrows.

Figure 6 is a vertical longitudinal sectional view taken substantially on the line 6—6 of Figure 4, looking in the direction indicated by the arrows.

Figure 7 is a fragmentary view in elevation, illustrating the manner in which the instrument may be employed as a depth gauge.

The instrument embodying the invention comprises a pair of arms indicated in general one by the numeral 1 and the other by the numeral 2, and the said arm 1 is formed in one face with a recess 3 which extends longitudinally thereof from the outer end of the arm and inwardly from one longitudinal straight edge of the arm, indicated by the numeral 4, the side wall of the recess being indicated by the numeral 5 and being parallel to the other longitudinal straight edge of the arm 1, indicated by the numeral 6. The arm at its inner end is formed with spaced ears 7 and 8, the ear 7 being substantially semi-circular and occupying the same plane as the recessed or thinner portion 3 of the arm and being integral with the said inner end of this portion of the arm. The ear 8 occupies a plane parallel to and spaced from the ear 7 and is of approximately circular form and concentric to the ear 7 and integral with the inner end of the arm 1 at that portion which is intact or, in other words, which is not recessed. The arm 2 is provided at its inner end with an approximately circular ear 9 one side of which is flush with the under side of the arm and the said ear is of less thickness than the arm so that at the inner end of the arm there is provided an arcuate shoulder indicated by the numeral 10. The ear 9 of the arm 2 is fitted between the ears 7 and 8 of the arm 1, and a bushing 11 is fitted through registering openings formed in the several ears, the bushing being provided at one end with a head 12 engaging the under side of the arm 1 and being interiorly threaded, as indicated by the numeral 13, to accommodate the shank of a set screw 14, the head 15 of which screw bears against the upper face of the ear 8, as clearly shown in Figure 5 of the drawings, the two arms being, in this manner, pivotally connected for relatively angular adjustment and being adapted to be held in various positions of relative adjustment by tightening the said screw 14. At this point it will be understood, and particularly by reference to Figures 1 and 4 of the drawings, that the arm 2 is adapted to be swung or folded to position lying wholly within the recess 3 and filling the said recess and with one of its straight longitudinal edges, indicated by the numeral 16, abutting the wall 5 of the recess 3, the other longitudinal straight edge of the arm 2, indicated by the numeral 17, at such time being in registration with the straight edge 4 of the arm 1.

The arms 1 and 2 are provided, diametrically opposite the axes of their pivot ears, with shoulders indicated respectively by the numerals 18 and 19, and it will be evident that when the arms are swung to full open position, these shoulders will mutually abut and the straight edges 6 and 17 of the arms 1 and 2 will be in true alinement. The upper faces of the arms are therefore conveniently provided along their said straight edges, with a linear scale indicated by the numeral 20 and having a length, for example, of one foot, one-half of the scale being arranged upon the arm 1 and the other half of the scale upon the arm 2. Therefore, when the arms are in alinement, the instrument may be employed as a foot rule for the purposes of measurement, or it may be employed as a straight edge in laying out lines of given lengths. Likewise, when the arms are folded, as in Figure 1, either of the straight edges 6 and 17 may be similarly employed. The scale 20, being a linear scale, is divided into inches and fractions of inches, and the sub-division of the inch divisions may be carried to any desired extent. A similar linear scale 21 is provided upon the recessed face of the arm 1 along the straight edge 4. In like manner, a linear scale 22 is provided upon the upper face of the arm 2 along the straight edge 16 of the said arm.

The recessed portion of the arm 1 is formed with a slot indicated by the numeral 23, and the walls of this slot, indicated by the numerals 24 and 25, extend along diverging lines, the slot as a whole extending longitudinally of the said portion of the arm 1. A diameter scale 26 is arranged upon the upper face of the said portion of the arm along the wall 25 of the slot, and a screw gauge scale 27 is similarly arranged upon the said face of the said portion of the arm along the wall 24 of the slot. Wire gauge scales 28 and 29 are arranged upon the under face of the arm 1, respectively along the walls 24 and 25 of the slot 23 as clearly shown in Figure 3 of the drawings. The several scales 26, 27, 28 and 29 are differently calibrated for determining the diameter of wire, rods, nails, screws, and the like, according to a determinate and selected scale.

The caliper gauge is indicated in general by the reference numeral 30 and this gauge comprises a head 31 which is of a length corresponding to the width of the arm 1 and of a thickness equal to the major thickness of the said arm. A blade 32 extends at one side of the head 31 in close proximity to one end of the head and this blade is of flat form and is slidably adjustable in a rectangular socket 33 formed in and extending longitudinally of the thicker portion of the arm 1, as best shown in Figure 6 of the drawings. The arrangement of the blade 32 and head 31 of the caliper gauge is such that in the sliding adjustment of the blade 32 in the socket 33 of the arm 1, that side of the head 31 from which the blade extends will be spaced a greater or less distance from and presented directly toward the end of the arm 1 and likewise the arm 2, when the arms are folded as shown in Figure 1. Thus, the opposing surfaces of the head 31 and arms 1 and 2 constitute the work-engaging surfaces of the gauge, and the blade 32 is provided with a scale 34, the marks of which, in the adjustment of the blade 32, will register with the end of the arm 1 so as to indicate the distance between the opposing surfaces of the head 31 and the arms 1 and 2, and thereby indicate the diameter or thickness of a piece of work to which the gauge is applied for the purpose of measurement. In order that the caliper gauge may be maintained in any position to which it may be adjusted, and without the employment of any mechanical means for this purpose, as for example a set screw, the blade 32, which is of metal, is formed in its inner end with a notch 35, and the blade at one side of the notch is sprung outwardly so as to provide a more or less resilient friction nose 36 which slides frictionally along the wall of the socket 33 in the adjustment of the blade. The end of the nose and the end of the blade at the opposite side of the notch, are both rounded as at 37 and 38 so as to provide for ready insertion of the blade.

Preferably, one face of the head 31 will be provided with a short linear scale 39 extending along the outer edge of the head and this scale will be of a length of an inch or more and the sub-divisions of the scale will be in thirty-seconds of an inch. A similar scale 40 is provided upon the opposite face of the head 31 and its sub-divisions represent sixty-fourths of an inch.

The depth gauge of the instrument is indicated in general by the numeral 40 and the same comprises a blade 41 which is slidably adjustably mounted in a longitudinally extending rectangular socket 42 formed in the arm 2, the said socket opening through the outer end of the said arm. The arm is likewise formed longitudinally of one wall of the socket 42, with a slot 43, and the blade 41 is provided at its end which is next adjacent the pivot for the arms 1 and 2, with a shallow boss 44 of rectangular form, which boss works in the slot 43. A set screw 45 is provided in connection with the blade 41 and has its shank 46 threaded through an opening 47 formed in the said blade 41 and its boss 44, the end of the set screw shank being adapted to bear against the wall of the socket 42, when the screw is tightened, for the purpose of holding the blade 41 in any position to which it may be adjusted. The head 31 of the caliper gauge is formed with a slot 48 opening through its inner and outer edge faces and so positioned and of such dimensions as to register with the open outer end of the socket 42, so that the blade 41 may be projected through and beyond the head 31, as illustrated in Figure 7 of the drawings, in making depth measurements, the blade being provided with a scale 49 for registration with the outer edge face of the head 31 to indicate the extent of projection of the blade beyond the said head, it being understood by reference to Figure 7, that the edge face of the head is designed to be disposed against the surface in which the opening or recess, or other cavity, the depth of which is to be measured, is located, and that the blade is to be projected into the cavity until its end strikes the bottom of the cavity, whereupon the set screw 45 may be tightened to secure the blade in its position of adjustment until the necessary reading is taken.

In order that the instrument may be employed as a level, the arm 2 is formed in its straight edge 17 with a recess 50 closed by a cap plate 51 and housing a spirit tube 52, the plate having a slot 53 therein, through which the bubble in the tube may be observed.

The face of the ear 8 of the arm 1 is provided with a protractor scale 54, each division of which represents five degrees of angular measurement, the scale extending along the margin of the said face as best shown in Figures 1 and 2 of the drawings. A vernier scale 55 is provided upon the face of the arm 2 and extends along the shoulder 10 and consequently in position for registration of its divisions with the divisions of the protractor scale 54. The vernier scale 55 includes a zero mark 56 and the divisions of the scale are each a half of a degree less than the divisions of the protractor scale 54. Preferably, the scale 55 has ten divisions so that the length of this scale is equivalent to forty-five degrees on the protractor scale. At this point it will be understood that the protractor and vernier scales may be employed in conjunction with each other where the instrument it to be employed as a vernier protractor, and that where it is to be employed merely as an angle in plotting angles or inclines, or measuring angles or inclinations, the zero mark 56 of the vernier scale may be read in conjunction with the protractor scale 54.

It will be understood that when the instrument is folded, the arms of the instrument may be held against relative swinging movement by loosening the set screw 45 and sliding the depth gauge blade 41 outwardly until the end of the blade engages in the slot 48, and then tightening said set screw.

Having thus described the invention, what I claim is:

1. A measuring instrument comprising a pair of pivotally connected arms, a caliper gauge comprising a blade slidably adjustably mounted in one of said arms and a head supported by the outer end of the blade and confronting the free ends of the arms, the said head having a slot therein, and a depth gauge comprising a blade slidably carried by the other arm and adjustable to project through the slot and beyond the outer side of the said head.

2. A measuring instrument comprising a pair of pivotally connected arms, one of said arms having a longitudinal socket formed therein, a blade slidably adjustably mounted in said socket, a head supported at the outer end of the blade and having a side confronting the free ends of the arms whereby to constitute a caliper gauge, the said head having a slot therein, the other arm having a longitudinal socket formed therein, a depth gauge comprising a blade slidably adjustably mounted in the socket and adjustable to project through the said slot and beyond the opposite side of the said caliper gauge head, and means for holding the depth gauge blade in positions of adjustment, the said depth gauge blade, when adjusted to project at its outer end into the slot in the caliper gauge head, constituting means for preventing unfolding of the arms about their pivot.

3. A measuring instrument comprising an arm having a longitudinal socket formed therein and opening through one end of the arm, the said end of the arm being at right angles to the line of extent of the socket, the arm being formed in one face with a longitudinally extending slot communicating with the socket, and a depth gauge blade slidably adjustably mounted in the socket and having a scale for registration with said end of the arm, the said blade having a boss slidably engaging in the slot, and a set screw having its shank threaded through the boss and the blade and adjustable to bear at its end against the opposite wall of the socket to that in which the slot is formed.

In testimony whereof I affix my signature.

FRANK SCHLATTAU. [L. S.]